United States Patent Office 3,025,325
Patented Mar. 13, 1962

3,025,325
METHOD FOR THE PRODUCTION OF 1-DIMETHYLAMINO - 2 - CHLOROALKYL HYDROCHLORIDES
Robert Velgos, St. Louis, Mich., assignor to Michigan Chemical Corporation
No Drawing. Filed Apr. 15, 1959, Ser. No. 806,452
4 Claims. (Cl. 260—583)

This invention relates to an improved method for the production of 1-dimethyl-amino-2-chlorethane hydrochloride and 1-dimethyl-amino-2-chloropropane hydrochloride.

1-dimethyl-amino - 2 - chloroethane hydrochloride and 1-dimethyl-amino-2-chloropropane hydrochloride are valuable intermediates for the manufacture of pharmaceutical compounds. These compounds have been produced heretofore by the reaction of thionyl chloride with dimethylaminoethanol and with dimethylaminoisopropanol, respectively, in the presence of toluene or benzene. They have both been tan, powdered solids at ambient temperatures which tend to agglomerate into solid masses on standing.

It is an object of this invention to provide a method for the production of 1-dimethyl-amino-2-chloroethane hydrochloride and 1-dimethyl-amino-2-chloropropane hydrochloride in white, crystalline, free-flowing forms which are distinct improvements in the purity and physical characteristics of these products, as they have been produced by prior methods.

Another object is to provide a method for the production of 1-dimethyl-amino-2-chloroethane hydrochloride and 1-dimethyl-amino - 2 - chloropropane hydrochloride which are of high purity and almost entirely free of iron, using as one of the raw materials a technical grade thionyl chloride which contains iron compounds as impurities.

A further object is to provide a method for the production of 1-dimethyl-amino-2-chloroethane hydrochloride and 1-dimethyl-amino - 2 - chloropropane hydrochloride which results in crystal form of these products which have high bulk densities and, therefore, require less packing space than those heretofore produced.

A further object of this invention is to provide a method for the production of 1-dimethyl-amino-2-chloroethane hydrochloride and 1-dimethyl-amino-2-chloropropane hydrochloride which requires a smaller volume of solvent as a reaction medium than the prior art processes and, therefore, produces a larger amount of the desired product in each batch using any particular set of equipment, with a material saving both in the capital investment required for equipment and in the labor costs involved in producing the compounds.

Other objects of this invention and its various advantageous features will become apparent as this description proceeds.

This invention is the result of extensive research to raise the quality of various dialkylaminoalkylchloride hydrochlorides used as intermediates in the pharmaceutical industry. 1-dimethyl-amino-2-chloroethane hydrochloride has heretofore been produced by the reaction of thionyl chloride with dimethylaminoethanol in the presence of benzene or toluene while 1-dimethyl-amino-2-chloropropane hydrochloride has been produced by the reaction of thionyl chloride with dimethylaminoisopropanol in the presence of benzene or toluene. These products have heretofore been tan or brown in color and in the form of finely-divided powders which tended to agglomerate into solid masses.

In the course of this research it has been demonstrated that these compounds, in their pure forms, are inherently water-white and that they tend to crystallize in a free-flowing needle-like form. It has been found that by the use of ethylene dichloride as a reaction medium for the production of 1-dimethyl-amino-2-chloroethane hydrochloride and of 1-dimethyl-amino-2-chloropropane hydrochloride products of materially improved quality could be obtained with a materially reduced volume of the reaction medium. The improvement in quality was in their color, in a reduction in their contents of water-insoluble material and in a reduction in their residual content of iron from about 200 parts per million to about 8 parts per million, or less. Thus, the prior art products were tan in color, with a distinct tendency to agglomerate, whereas the products in accordance with this invention are white and free-flowing.

This research has demonstrated that ethylene dichloride is quite specifically adapted for use as a reaction medium in the production of 1-dimethyl-amino-2-chloroethane hydrochloride and of 1-dimethyl-amino-2-chloropropane hydrochloride. The aliphatic hydrocarbon solvents, as well as benzene and toluene, gave tan powdered products which tended to agglomerate. The action of ethylene dichloride as a reaction medium was distinctly different and superior to that of its closest homologue, propylene dichloride. Other chlorinated solvents were found to be unsuitable. Methylene chloride was found to be unsuitable due to its solvent action on the product.

The usefulness of ethylene dichloride is also quite specific from the standpoint of the particular dialkylaminoalkyl chloride hydrochloride involved. Thus, while it has been demonstrated to be of outstanding value in the production of 1-dimethyl-amino-2-chloroethane hydrochloride and of 1-dimethylamino-2-chloropropane hydrochloride, it has been found unsuitable for use, for example, in the production of 1-diethylamino-2-chloroethane hydrochloride due to low yields of this compound when it is used as a reaction medium. The low yields obtained are believed to be due to the excessive solubility of the 1-diethylamino-2-chloroethane hydrochloride in the ethylene dichloride.

The ethylene dichloride used as a reaction medium in the method in accordance with this invention may be diluted with other volatile solvents. Thus, it has been found that a mixture of 75 parts, by volume, of ethylene dichloride and 25 parts, by volume, of benzene is about as effective as the ethylene dichloride itself. However, there is little or no advantage gained by such dilution, even by a cheaper solvent such as benzene, since the ethylene dichloride itself may, in any case, be repeatedly reused with periodic intermediate distillation and/or recovery treatments as described hereinafter. A second solvent, such as, benzene, complicates the intermediate distillations, to an extent which does not justify the reduction in the cost of the reaction medium which results from its use.

By the method in accordance with this invention, thionyl chloride is reacted with dimethylaminoethanol or with dimethylaminoisopropanol in a reaction medium consisting essentially of ethylene dichloride. This reaction in the case of the production of 1-dimethyl-amino- 2-chloroethane hydrochloride proceeds in accordance with the following chemical equation:

$$(CH_3)_2NCH_2CH_2OH + SOCl_2 \rightarrow$$
$$(CH_3)_2NCH_2CH_2Cl - HCl + SO_2\uparrow$$

In carrying out this method, ethylene dichloride, or ethylene dichloride admixed with a minor proportion of another volatile solvent and thionyl chloride are charged to a reactor and the dimethylalkanolamine is then added slowly to the reactor while the reaction mixture is being agitated. In the production of 1-dimethyl-amino-2-chloroethane hydrochloride the mixture of thionyl chloride and the ethylene dichloride is preferably at a temperature within the range of about 25° C. to about 55° C. at the beginning of the addition of the dimethylaminoethanol.

In the production of 1-dimethyl-amino-2-chloropropane hydrochloride, the mixture of the thionyl chloride and the ethylene dichloride is preferably at a temperature within the range of about 50° C. to about 60° C. at the beginning of the addition of the dimethylaminoisopropanol. The addition of the dimethylalkanolamine to the reactor causes foaming of the reaction mixture due to the evolution of sulfur dioxide. After the addition of the dialkanolamine is completed, the agitation of the reaction mixture is continued until the reaction is completed while increasing its temperature from the original temperature of the mixture of ethylene dichloride to a temperature within the range of about 50° C. to the reflux temperature of the reaction mixture under atmospheric pressure which usually approximates 60° C. but which has been found to vary from about 75° C. to about 83° C. depending upon the composition of the mixture.

As indicated by the above equation, one mole of thionyl chloride reacts with one mole of the dimethylalkanolamine. However, to secure maximum yield in the reaction it is desirable to use an excess of thionyl chloride and it has been found desirable to use an amount of thionyl chloride within the range of about 1.05 moles to about 1.30 moles of thionyl chloride for each mole of the dimethylalkanolamine used in the reaction.

In carrying out this reaction, it has been found desirable to use about 2.5 parts, by weight, to about 5.2 parts, by weight, and, preferably, about 3.8 parts, by weight, to about 4.0 parts, by weight, of ethylene dichloride per part, by weight, of the dimethylalkanolamine used in the reaction mixture. Larger amounts of the ethylene dichloride can be used. However, one of the distinct advantages in the use of ethylene dichloride arises from the fact that a relatively small volume of ethylene dichloride gives a reaction mixture which is readily agitated and from which the evolution of sulfur dioxide is not violent and is readily controllable. In fact, it has been found that one part by volume of ethylene dichloride can be used to replace two volumes of the benzene which has heretofore been used, or stated in another way, about twice as much of the product dimethylaminoalkyl hydrochloride can be prepared in a given volume of ethylene dichloride as in the same volume of benzene. This is, of course, an advantage of tremendous importance in the industrial production of these materials, since it doubles the capacity of any given plant for their production.

After the completion of the reaction, as shown by the termination of the evolution of sulfur dioxide, the reaction mixture which is a slurry of crystals of the dimethylamino chloroethane hydrochloride or of dimethylamino chloropropane hydrochloride, as the case may be, in ethylene dichloride, is cooled to a temperature within the range of about 20° C. to about 40° C., and filtered. The product in the form of a crystalline solid is then washed with ethylene dichloride and dried by heating it to a temperature within the range of about 70° C. to about 100° C.

The 1-dimethyl-amino-2-chloroethane hydrochloride or the 1-dimethyl-amino-2-chloropropane hydrochloride produced by the method in accordance with this invention is in the form of free-flowing, white crystals as compared with the tan powder produced heretofore by the use of benzene as a reaction mixture. Furthermore, the iron content is materially lower and the contents of water-insoluble material and of volatile material are materially lower than the prior art products. Also, the bulk density of the products produced by this method are substantially higher than those obtained by the use of benzene as a reaction medium. This higher bulk density is advantageous in that it increases the weight of the products which can be packed in a container of any given volumetric capacity.

In the foregoing, the method in accordance with this invention has been generally described. It will now be specifically illustrated by detailed examples. In the following, the application of the method in accordance with this invention to the production of 1-dimethyl-amino-2-chloroethane hydrochloride on a laboratory scale is illustrated by Examples 1–7, inclusive, along with Examples 8, 9, 10 and 11 which illustrate the use of propylene dichloride and methylene chloride as a reaction medium for the preparation of this compound. Examples 8, 9, 10 and 11 are not illustrations of the method of this invention, but are included to demonstrate the unique behavior of ethylene dichloride as compared with that of its closest homologues, propylene dichloride and methylene chloride in the production of 1-dimethyl-amino-2-chloroethane hydrochloride. Example 12 illustrates the application of this method to the production of 1-dimethyl-amino-2-chloroethane hydrochloride on a pilot plant scale and demonstrates the advantages of the method of this invention over the prior art method using benzene as a reaction medium, in increasing the capacity of equipment used to produce the material and the advantageous increased bulk density of the material.

The application of the method of this invention to the production of 1-dimethyl-amino-2-chloropropane hydrochloride on a laboratory scale is illustrated by Examples 13 to 17, inclusive, while Example 18 emphasizes the unique action of ethylene dichloride when used as a reaction medium in the production of this compound. Example 19 to 23, inclusive, do not illustrate the method of this invention, but are presented to illustrate the use of reaction media, other than ethylene dichloride, in the preparation of 1-dimethylamino-2-chloropropane hydrochloride and to provide comparisons to show the definite advantages presented by the method of this invention. Example 24 illustrates the application of this method to the preparation of 1-dimethyl-amino-2-chloropropane hydrochloride on a pilot plant scale.

EXAMPLES 1–11, INC.

*Laboratory Preparation of 1-Dimethylamino-2-Chloroethane Hydrochlorides*

In each of Examples 1–11, inclusive, a one liter, 3-necked flask equipped with a stirrer, a thermometer well and an addition funnel was charged with the amount of ethylene dichloride, propylene dichloride or methylene dichloride shown by Tables I and II, and with the quantity of thionyl chloride shown by those tables. The quantity of technical grade dimethyl-amino-ethanol shown by Tables I and II was then slowly added to the flask over a period of about one hour, while permitting the temperature to rise to about 40° C. and then cooling the reaction mixture to prevent a further increase in temperature. Following the addition of the dimethylaminoethanol, the mixture was heated to reflux temperature in about three hours. The slurry was then cooled to about 25° C. and filtered. The crystalline filter cake was then washed with 200 ml. of the same solvent which was used as a reaction medium. The product was then dried over night at a temperature within the range of about 60° C. to about 80° C.

TABLE I

*Reactants, Reaction Conditions and Products of Examples 1 to 7, Inc.*

| Example No. | 1 | 2 | 3 | 4 | 5 | 6 | 7 |
|---|---|---|---|---|---|---|---|
| Ethylene dichloride—ml | 560 | 560 | 560 | 560 | 458 | 448 | 346 |
| Grade | Reg. | Reg. | Reg. | Reg. | Reg. | By-Prod. | Filt. |
| Dimethylamino-ethanol (Tech) gram—moles | 1.00 | 1.50 | 2.00 | 2.00 | 2.50 | 2.00 | 1.50 |
| Thionyl chloride moles | 1.20 | 1.80 | 2.40 | 2.40 | 3.00 | 2.45 | 1.80 |
| Grade | High | High | High | Tech | Tech | Tech | Tech |
| Max. Reflux Temp., °C | 80 | 83 | 83 | 80 | 80 | 80 | 80 |
| Slurry Quality [1] | G | G | G | G | P | G | G |
| Alcohol Eff. percent | 93.0 | 94.2 | 96.0 | 93.8 | 91.8 | 93.5 | 95.9 |
| Thionyl chloride Eff. percent | 77.5 | 78.7 | 80.2 | 78.2 | 76.6 | 77.9 | 79.9 |
| Ml. Solvent/g. product | 4.09 | 2.72 | 2.04 | 2.04 | 1.34 | 1.64 | 1.68 |
| Product: | | | | | | | |
| Color [2] | W | W | W | W | W | W | W |
| Color percent Trans | 97 | 95 | 96 | 97 | 95 | 95 | 94 |
| Crystal Form [3] | N | N | N | N | N | N | N |
| M.P.—°C | 208–209 | 207 | 207–208 | 203–204 | 206–207 | 205–206 | 206–207 |
| Ionic chlorine, percent theory | 100.7 | 100.2 | 99.6 | 99.6 | 100 | 99.7 | 100.3 |
| Total chlorine, percent theory | 100.3 | 99.5 | 99.2 | 99.4 | 99.7 | 99.1 | 99.0 |
| Water Ins., percent | 0.01 | | | | 0.02 | 0.001 | 0.002 |
| Iron, p.p.m | | 5 | 3 | 3 | 5 | 47 | 0 |

[1] Slurry Quality:
"G" designates a fluid slurry which is readily stirred and otherwise efficiently handled.
"P" designates a heavy slurry which cannot be readily kept homogeneous by stirring and is inefficient in plant production.

[2] Color:
"W" designates a white product.
"T" designates a tan product.
"Percent Trans." is the percent transmission of light through a solution of 10% by weight of the product in ethanol when measured under standardized conditions.

[3] Crystal Form—"N" designates relatively large, but discrete needle-like crystals which filtered rapidly and dried without agglomeration.

TABLE II

*Reactants, Reaction Conditions and Products of Examples 8 to 11, Inc.*

| Example No | 8 | 9 | 10 | 11 |
|---|---|---|---|---|
| Propylene dichloride—ml | 420 | 560 | | |
| Grade | Reg. | Filt. | | |
| Methylene chloride—ml | | | 560 | 448 |
| Dimethylaminoethanol (Tech) gram—moles | 1.88 | 2.00 | 1.00 | 2.00 |
| Thionyl chloride moles | 2.25 | 2.45 | 1.20 | 2.40 |
| Grade | Tech | Tech | Tech | Tech |
| Max. Reflux Temp., °C | 92 | 80 | 38 | 36 |
| Slurry Quality [1] | G | G | G | G |
| Alcohol Eff. percent | 95.5 | 96.1 | 91.9 | 91.6 |
| Thionyl chloride Eff. percent | 79.9 | 80.5 | 76.6 | 76.4 |
| Ml. Solvent/g. product | 1.63 | 2.04 | 4.23 | 1.70 |
| Product: | | | | |
| Color [2] | T | T | W | W |
| Color, percent Trans | 40 | 39 | 99 | 97 |
| Crystal Form [3] | N | N | N | N |
| M.P.—°C | | | 204–206 | 203–204 |
| Ionic chlorine, percent theory | | | 100.0 | 99.4 |
| Total chlorine, percent theory | | | 99.6 | 98.9 |
| Water Ins., percent | 0.29 | 0.21 | 0.06 | 0.04 |
| Iron, p.p.m | | 52 | 0 | 5 |

Symbols for data same as Table I

Reference to Table I shows that in Examples 1–7, inclusive, in which ethylene dichloride was used as a reaction medium, the products were in the form of small needle-like white crystals which filtered rapidly and dried without agglomeration, and which had a color when measured in terms of the percentage of light transmitted through a 10% solution of the product within the range of 94% to 97%. By way of comparison, it will be noted by reference to Table II, that the product of Example 8 in which propylene dichloride was used as a reaction medium, had a satisfactory crystal form, but was tan and had a color value measured in terms of the percentage of light transmitted through a 10% solution of the product in 90% ethanol.

A comparison of the data presented for Examples 6 and 8 shows that the tan color of the product of Example 8 was very probably due to its content of water-insoluble material, rather than to its relatively high iron content. Thus, the product of Example 6 was white and had light transmission of 95% and the very low content of 0.001% water-insoluble material, but a relatively high iron content of 47 p.p.m. On the other hand, the tan product of Example 8, with a light transmission of only 40% had a content of water-insoluble material of 0.29% or almost three hundred fold that of the product of Example 6, but only a slightly higher iron content of 52 p.p.m.

By similar comparison, it will be noted that the products of Examples 10 and 11, in which methylene chloride was used as a reaction medium, had a satisfactory crystal form and satisfactory color but contained a significantly higher percentage of water insoluble material. The solution of the products of these examples in water was characterized by a colorless, but cloudy appearance, whereas the appearance of aqueous solutions of the products of Examples 1–7 were colorless and generally clear.

Aside from this consideration, the use of methylene chloride as a medium for this product is undesirable for reasons less obvious in the laboratory examples than in large scale operations. Low boiling solvents are generally unsatisfactory in operations which involve prolonged reflux, gas evolution, and vacuum filtration. Inefficient operation and high solvent losses would be expected. The cost of this solvent is such that high losses could not be economically tolerated.

It will be noted that the relatively high iron content of the product of Example 6 is not representative of the products prepared using ethylene dichloride as a reaction medium. Thus, the iron contents of the products of Examples 2, 3, 4, 5 and 7, fell within the low range of 0 to 5 p.p.m., as contrasted to the 47 p.p.m. iron content of the product of Example 6.

It will also be noted that Example 6 is substantially identical with Example 4 except for the fact that a by-product ethylene dichloride was used as a reaction medium, whereas in Example 4 a regular grade of ethylene dichloride was used as a reaction medium. The by-product ethylene dichloride, Example 6, differs from the regular grade (Example 4) in that it contains a residue of about 0.2% toluene. The relatively high iron content of the product of Example 6 appears to be due to the fact that the by-product ethylene dichloride was used as a reaction medium and it can be speculated that the presence of the 0.2% toluene was responsible for the high iron content.

It has been found that the ethylene dichloride filtrate from the production of 1-dimethylaminoethyl chloride hydrochloride can be used three or four times as a reaction medium. After this usage, the ethylene dichloride becomes dark colored and appears to affect the color of the product. Simple distillation of the dark colored, filtrate ethylene dichloride rendered it reusable as a fresh reaction medium, although it was too acidic for washing purposes. As will be exemplified hereinafter, the filtrate ethylene dichloride may be completely recovered and rendered suitable even for the final washing of the product by a relatively simply procedure.

Example 7 illustrates the reuse of filtrate ethylene dichloride as reaction medium. This ethylene dichloride was recovered from Example 6, and reused in the production of a second batch of 1-dimethylaminoethylchloride hydrochloride, and reused a second time in Example 7 without distillation. As will be noted from the data of Table I, the product of Example 7 had an iron content of 0 p.p.m. as compared with 47 p.p.m. contained by the product of Example 6 and that both had low contents of water insoluble material and comparably good colors. Thus, the tendency of the by-product ethylene dichloride to have a high residual iron in the product (Example 6) disappeared when the ethylene dichloride was reused.

It will be further noted from the data of Table I that Example 7, using filtrate ethylene dichloride as a reaction medium, gave a product which compared favorably with the products of Examples 1–5, inclusive, in which fresh, regular grade ethylene dichloride was used as the reaction medium.

Again referring to Example 8, it will be noted that the propylene dichloride used as a reaction medium was a fresh solvent. The propylene dichloride used in Example 9 was the filtrate from Example 8. It will be noted from Table II that the reuse of the propylene dichloride made no significant change in the unsatisfactory color and content of water-insoluble material in the product.

Again referring to Table I, it will be noted that in Examples 1, 2 and 3, a high grade of thionyl chloride was used as a reagent, while in remaining examples a technical grade of the material was used. The high grade thionyl chloride is low in iron compounds and is shipped in nickel drums to keep its iron content low. The technical grade thionyl chloride is shipped in iron drums and consequently contains varying amounts of iron compounds. Work outside the scope of this invention using benzene as a reaction medium has shown that the iron content of the thionyl chloride used as a raw material was carried over to the product.

As already noted, the high iron content of the product of Example 6 was due to the fact that a by-product ethylene dichloride containing residual toluene was used as a reaction medium. It will be also noted from Table I that there was no difference in the iron content of the products of Examples 2 and 3 (5 p.p.m. and 3 p.p.m. respectively) in which the high grade thionyl chloride was used and Examples 4 and 5 (3 p.p.m. and 5 p.p.m. respectively) in which the technical grade thionyl chloride was used. Thus, the use of ethylene dichloride as a reaction medium resulted in a low iron content regardless of whether a high grade or a technical grade thionyl chloride was used.

A comparison of the data of Examples 1, 2, 3, 4 and 5 shows that a reaction slurry classified as "good," i.e. one which could be readily stirred and otherwise processed, was obtained in the reaction mixture as the proportions of the reactants to the reaction medium was progressively increased from that of Example 1 in which one gram of product was produced for each 4.09 ml. of reaction mixture to that of Example 5 in which only 2.04 ml. of reaction mixture was used to produce one gram of product. However, as shown by Example 6, a further reduction in the amount of reaction medium to use only 1.34 ml. of reaction mixture for each gram of product obtained caused difficulty due to thickness of the slurry produced by the reaction which is classified as "poor" and which is unsatisfactory in commercial production.

In connection with this comparison, it may be noted that the concentrations illustrated by Example 1 are as high as can be satisfactorily used when using benzene or toluene as a reaction medium, rather than ethylene dichloride. From the data of Examples 3, 4, 5 and 6, it will be appreciated that with a given plant capacity, twice as much 1-dimethylaminoethylchloride hydrochloride can be produced when using ethylene dichloride as a reaction medium.

In the foregoing it has been pointed out with reference to the data of Table II that propylene dichloride as a reaction medium for this reaction is definitely inferior to ethylene dichloride from the standpoints of the residual water-insoluble material and the residual iron content of the final product, as well as its color. Methylene chloride as a reaction medium, on the other hand in inferior to ethylene dichloride from the standpoint of residual water-insoluble material of the final product, as well as its undesirable low boiling point. However, it is to be noted from the data for Examples 8, 9, 10 and 11, presented by Table II, that propylene dichloride and methylene chloride are the full equivalent of ethylene dichloride, in the form of the crystals produced by the reaction and in reduction in the volume of the reaction mixture which can be made while still obtaining a slurry which can be handled.

EXAMPLE 12

*Pilot Plant Production of 1-Dimethylamino-2-Cloroethane Hydrochloride*

A 750 gallon reactor was charged with the 268 gallons of ethylene dichloride and 1450 pounds of thionyl chloride. A total of 905 pounds of dimethylaminoethanol were then charged to the reactor over a period of three hours and then the reaction mixture was maintained at its reflux temperature for a period of 4 hours. At no time was the evolution of sulfur dioxide violent or the slurry formed by the reaction mixture too thick to agitate well. The reaction mixture was cooled to 25° C. and filtered by the use of a ceramic filter. The crystalline product was then washed with a total of 55 gallons of ethylene dichloride and then dried at a temperature of about 90° C. The total elapsed time from the initial reactor loading to the loading of the drier was 11 hours, and the drying time was 11 hours.

Table III presents a comparison of the quantities of the materials used in Example 12, with the quantities of materials used in carrying out this reaction in the same reactor using benzene as a reaction medium under the most favorable conditions as to quantities of material used and otherwise under the same reaction conditions utilized in Example 12.

TABLE III

*Comparison of the Quantities of Materials Required for the Production of 1-Dimethylamino-2-Chloroethane Hydrochloride in Ethylene Dichloride and in Benzene, Respectively*

| | Ethylene Dichloride Process (Example 12) | Benzene Process |
| --- | --- | --- |
| Solvent_____gal__ | 268 | 300 |
| Thionyl Chloride_____lbs__ | 1,450 | 700 |
| Dimethylaminoethanol_____lbs__ | 905 | 405 |
| Gal. Solvent/lb. Alcohol_____ | 0.296 | 0.742 |
| lb. Thionyl Chloride/lb. Alcohol_____ | 1.604 | 1.729 |
| lbs. of Product Isolated_____ | 1,358 | 620 |

From the data presented by Table III, it will be seen that the use of ethylene dichloride as a reaction medium permits the production of more than twice as much product in each batch as can be produced using benzene as a reaction medium.

Table IV presents a comparison of the properties of the 1-dimethylamino-2-chloroethane hydrochloride obtained in Example 12 with a typical product of the process using benzene as a reaction medium.

TABLE IV

*Comparison of the 1-Dimethylamino-2-Chloroethane Hydrochloride Produced by Example 12 With a Typical Sample of That Compound Produced in Benzene*

|  | Ethylene Dichloride Process (Example 12) | Benzene Process |
|---|---|---|
| Appearance | Relatively large, near-white crystals. | small, tan crystals. |
| Ionic Chlorine, percent theory | 98.9 | 99.0. |
| Total Chlorine, percent theory | 99.4 | 99.0. |
| Melting Point, °C | 200–203 | 198–201. |
| Color, percent Trans | 91 | 30. |
| Volatile Acidity, percent HCl | 0.005 | 0.008. |
| Iron, p.p.m. Fe | 8 | 200. |
| Water Insolubles, percent | 0.017 | 0.07. |
| Volatiles, percent | 0.12 | 0.10. |
| Apparent Density, lb./cu. ft | 35 | 21. |

It will be noted from the data of Table IV that the 1-dimethylamino-2-chloroethane hydrochloride produced by this method was definitely superior to the product of the process using benzene as a reaction medium in appearance and color, residual iron content, content of water-insoluble material and in apparent density.

It will also be noted from the data of Table IV that the 1-dimethylamino-2-chloroethane hydrochloride produced in Example 12 by the method in accordance with this invention, had a bulk density of 35 pounds per cubic foot, whereas the product resulting from the prior art process in which benzene was used as a reaction medium had a bulk density of 21 pounds per cubic foot. This increase in the bulk density is due to the improved crystal form of the product obtained by the method of this invention. This increase in bulk density is important in that it results in a reduction of one-third in the container, shipping and storage space required for the product.

EXAMPLES 13–18, INCLUSIVE

*Laboratory Preparation of 1-Dimethylamino-2-Chloropropane Hydrochloride Using Ethylene Dichloride as a Reaction Medium*

In each of Examples 13–18, inclusive, a one liter, 3-necked flask equipped with a stirrer, a thermometer well and an addition funnel was charged with 560 milliliters of ethylene dichloride of the grade described hereinafter in discussing these examples and with the quantity of technical grade thionyl chloride shown by Table V. The quantity of technical grade dimethylaminoisopropanol shown by that table was then slowly added to the flask over a period of about one hour while maintaining the temperature shown by Table V, by cooling the flask with cold water. Following the addition of the alcohol, the mixture was for one hour at 60 to 65° C. during which time the product precipitation began. The mixture was then heated to the maximum reflux temperature specified by Table V in about two hours. The product slurry was then cooled rapidly, filtered at 25° C. and in all examples other than Example 18, washed with about 250 ml. of fresh ethylene dichloride. The washing step was entirely omitted in Example 18. The crystals were dried overnight at a temperature within the range of about 60° C. to about 80° C.

TABLE V

*Reactants, Reaction Conditions and Products of Examples 13–18, Inc.*

| Example No | 13 | 14 | 15 | 16 | 17 | 18 |
|---|---|---|---|---|---|---|
| Ethylene dichloride—ml | 560 | 560 | 560 | 560 | 560 | 560 |
| Dimethylaminoisopropanol, gram-moles | 1.00 | 1.00 | 1.00 | 1.00 | 1.00 | 1.00 |
| Thionyl chloride gram-moles | 1.50 | 1.10 | 1.15 | 1.25 | 1.25 | 1.15 |
| Addition Temp., °C | 60 | 60 | 60 | 60 | 50 | 60 |
| Max. Reflux Temp., °C | 77 | 75 | 75 | 75 | 75 | 78 |
| Slurry Quality [1] | G | G | G | G | G | G |
| Alcohol Eff., percent | 88.6 | 87.3 | 90.5 | 86.7 | 89.9 | 101.9 |
| Thionyl chloride Eff., percent | 59.1 | 79.3 | 78.6 | 69.5 | 71.7 | 88.6 |
| Product: |  |  |  |  |  |  |
| Color [2] | W | W | W | W | W | B |
| Color percent Trans | 92 | 74 | 86 | 95 | 90 | <10 |
| Crystal Form [3] | N | N | N | N | N | N |
| M.P., °C | 191–192 | 191–192 | 193–194 | 192–193 | 191–192 | 189–190 |
| Ionic chlorine percent theory | 101.6 | 100.8 | 100.3 | 100.2 | 100.2 | 98.7 |
| Total chlorine percent theory | 101.6 | 99.7 | 100.0 | 100.2 | 99.6 | 98.7 |
| Water-Insolubles | 0.005 | 0.011 | 0.004 | 0.000 | 0.003 | 1.06 |
| Iron p.p.m | 10 | 0 | 0 | 0 | 0 | 231 |

[1] Slurry Quality—"G" designates a fluid slurry which is readily stirred and otherwise efficiently handled.
[2] Color:
"W" designates a white product.
"B" designates a brown product.
"Percent Trans." is the percent transmission of light through a solution of 10% by weight, of the product in ethanol when measured under standardized conditions.
[3] Crystal Form—designate small, but discrete needle-like crystals which filtered rapidly and dried without agglomeration.

Examples 13–18, inclusive, are fully illustrative of the application of the method in accordance with this invention for the production of 1-dimethylamino-2-chloropropane hydrochloride. Referring to the data of Table V, it will be noted that the products of each of these examples were white, small needle-like crystals which had quite low contents of both water-insoluble material and of iron.

A comparison of the data of Table V for Examples 13, 14, 15 and 16, shows the effect of the use of an excess thionyl chloride in the reaction. It will be noted that no advantage was obtained in using an excess of 50% thionyl chloride (Example 13) as compared with an excess of 10% (Example 14) or of 15% (Example 15), and that the use of the larger excesses merely had the effect of decreasing the thionyl chloride efficiency of the reaction.

The ethylene dichloride used as the reaction medium in Example 13 was the regular commercial grade of ethylene dichloride. That used in Examples 14 and 15 was the by-product grade containing a residue of about 0.2% toluene, mentioned hereinbefore, while that used in Example 16 was the filtrate recovered from the production of a prior batch of the material, which had been subjected to simple distillation. The ethylene dichloride used in Example 17 was the filtrate recovered in Example 16, which was used without distillation. That used in Example 18 was the filtrate recovered in Example 14 which was also used without distillation. It will be noted from the data of Table V that the products produced in each of these examples, with the single exception of Example 18, were generally comparable as to their color, water-insoluble content and their iron content.

Example 18, when compared with Example 17, demonstrates the unique action of ethylene dichloride as a reaction medium. This example exactly parallels Example 17 in that the ethylene dichloride used as a reaction medium was an undistilled filtrate from a prior batch of materials. However, it differs from Example 17 in that the product was not given a final wash with ethylene dichloride to remove the liquid adhering to the filtered crystals. From the data presented by Table V, it will be noted that the product of this example is directly comparable with the products of the examples discussed in the foregoing as to slurry quality, yield and analysis as to chlorine content. However, it will be noted from the data that the product of Example 18 was brown in color and had a color, in terms of light transmission, as defined hereinbefore, of <10. Further, it will be noted that it had the high iron content of 231 p.p.m., as compared with 0 p.p.m. in the products of Examples 12, 13, 14 and 15. Furthermore, it had a content of water-insoluble material of 1.06%, by weight, or more than one-hundred fold that of the products of Examples 14–17, inclusive.

From the foregoing, it will be appreciated that the ethylene dichloride used as a reaction medium in both Examples 17 and 18 carried by-product material from its use as a reaction medium in a prior example. This by-product material was increased by its second use in each of these examples, yet in Example 17, in which the residual contaminated ethylene dichloride was removed from the filtered crystalline product, the product had good color and low contents of both iron and of water-insoluble material. In direct contrast, the product of Example 18 which carried the residual solids left by the evaporation of the contaminated ethylene dichloride had quite bad color and a high content of both iron and of water-insoluble material.

This comparison shows that the ethylene dichloride retains the by-product material which is responsible for the color, and for the high content of iron and water-insoluble material in solution during the crystallization of the 1-dimethyl-amino-2-chloropropane hydrochloride, rather than permitting them to become a part of the crystalline product. In the case of this product, as in the case of 1-dimethylaminoethylchloride hydrochloride, the water-insoluble material is believed to be primarily responsible for the color of the material which has been produced by the prior art processes.

EXAMPLES 19–23, INC.

*Laboratory Preparation of 1-Dimethylamino-2-Chloropropane Hydrochloride in Various Solvents Other Than Ethylene Dichloride*

The procedure described hereinbefore for the preparation of 1-dimethylamino-2-chloropropane hydrochloride by Examples 13–18, inclusive, was followed using the various solvents listed in Table VI instead of ethylene dichloride using a high proportion of the solvent in the reaction mixture to secure a slurry which could be readily stirred. In Table VI, the characteristics of the products secured in these examples are compared with those of the product of Example 14 which was prepared by the method in accordance with this invention.

TABLE VI

*Products of Examples 19–23, Inc., Compared with Product of Example 16*

| Example No. | 16 | 19 | 20 | 21 | 22 | 23 |
|---|---|---|---|---|---|---|
| Solvent Used | Ethylene dichloride. | Benzene | Petroleum Distillate. | Carbon Tetrachloride. | Propylene dichloride. | Methylene Chloride. |
| Color [1] | W | B | B | B | B | B. |
| Color, percent Trans. | 95 | 10 | 10 | 10 | 10 | 45. |
| Crystal Form [2] | N | P | P | P | N | N. |
| M.P., °C | 192–193 | 185–186 | 183–184 | 183–184 | | 187–188. |
| Ionic Chlorine, percent theory. | 100.2 | 100.5 | 99.5 | 100.3 | | 99.5. |
| Total Chlorine | 100.2 | 99.4 | 99.7 | 97.6 | | 99.1. |
| Water-Ins. | 0.000 | 0.13 | 0.22 | 1.42 | 1.18 | 0.05. |
| Iron, p.p.m. | 0 | 34 | 5 | | 7 | 65. |

[1] Color:
"W" designates a white product.
"B" designates a brown product.
"Percent Trans." is the percent transmission of light through a solution of 10% by weight, of the product in ethanol when measured under standardized conditions.
[2] Crystal Form:
"N" designates small, but discrete needle-like crystals which filtered rapidly without agglomeration.
"P" designates a fine powder which is difficult to filter.

It will be noted from the data of Table VI that each of the products prepared using benzene, a petroleum distillate, carbon tetrachloride and methylene chloride, respectively, as a reaction media, were brown powders which had relatively high color in ethanol solution as measured by the percent transmission of light, whereas the products prepared by the method of this invention, as illustrated by the product of Example 14, are white, needle-like crystals which have very little color in ethanol solution as measured by the percent light transmission. Further, it will be noted that products prepared in benzene, a petroleum distillate, carbon tetrachloride and methylene chloride respectively, contained relatively high percentages of water insoluble material. Lastly, in addition to the aforesaid disadvantages for this group of solvents, methylene chloride was found more unsuitable because of its low boiling point, the consequences of which were described earlier, and its excessive solvent action on the product which materially reduced recovery of the 1-dimethyl-amino-2-chloropropane hydrochloride crystals.

Still referring to Table VI, it will be noted that the product prepared using propylene dichloride as a reaction medium (Example 12) had, like those prepared by the method of this invention, a needle-like crystal form. However, the crystals of this product were brown in color, had high color in ethanol solution and a relatively high content of water-insoluble material.

Thus, the data of Table VI demonstrates the unique action of ethylene dichloride as a reaction medium for the production of 1-dimethylaminoisopropylchloride hydrochloride in both causing the product to crystallize as readily filterable, needle-like crystals and in causing the exclusion of the water-insoluble material and the iron from the crystals. It is to be noted that carbon tetrachloride had neither of these actions. Although propylene dichloride is the closest homologue to ethylene dichloride, it did not have the action of excluding the water-insoluble material from the 1-dimethylaminoisopropyl chloride hydrochloride and did not produce a product of good color, although it did have the property of causing the product to crystallize in the form of needle-like crystals. This comparison of the action of ethylene dichloride, with that of propylene dichloride demonstrates that the manner in which the product crystallizes is not responsible for the exclusion of the water-insoluble material and the color from the product.

EXAMPLE 24

*Production of 1-Dimethylamino-2-Chloropropane Hydrochloride*

A 750 gallon reactor was charged with 330 gallons of ethylene dichloride and 725 pounds of thionyl chloride. The reactor was then charged with 507 pounds of dimethylaminoisopropanol, containing 1%, by weight, of water, over a period of 2 hours. The alcohol was added at a temperature about 50° C. to about 60° C. After the addition of the alcohol was completed, the reaction mixture was stirred for one hour at 60-65° C. and then heated to a steady reflux temperature for one hour. The resulting reaction mixture was a slurry which was at no time too thick to be well agitated and easily pumped to the filters after cooling to 25° C. The reaction mixture was then cooled to 25° C., filtered on a ceramic filter, and the crystalline product washed with 100 gallons of ethylene dichloride. The crystals were then dried by heating them at a temperature of about 90° C. for a period of 6.5 hours.

Table VII presents a comparison of the quantities of reactants and of ethylene dichloride used in the production of 1-dimethylamino-2-chloropropane hydrochloride in Example 24 with the quantities of reactants and of benzene used in the production of that compound in the same reactor under the most favorable conditions of reaction which had heretofore been developed for the use of benzene as a reaction medium.

TABLE VII

*Comparison of the Quantities of Materials Required for the Production of 1-Dimethylamino-2-Chloropropane Hydrochloride in Ethylene Dichloride and in Benzene, Respectively*

|  | Ethylene Dichloride Process | Benzene Process |
|---|---|---|
| Solvent_____gal__ | 330 | 409 |
| Thionyl Chloride_____lb__ | 725 | 216 |
| Dimethylaminoisopropanol_____lb__ | 507 | 151 |
| gal. Solvent/lb. Alcohol_____ | 0.650 | 2.71 |
| lb. Thionyl Chloride/lb. Alcohol_____ | 1.43 | 1.43 |
| lbs. of Product Isolated_____ | 700 | 220 |

It will be observed from the data of Table VII that the quantities of reactants and hence, the amount of the 1-dimethyl-2-chloropropane hydrochloride produced when using ethylene dichloride as a reaction medium was more than three-fold that possible when using benzene as a reaction medium.

Table VIII presents a comparison of the properties of the 1-dimethyl-2-chloropropane hydrochloride produced by Example 24 with a typical product heretofore produced using benzene as a reaction medium.

TABLE VIII

*Comparison of the 1-Dimethylamino-2-Chloropropane Hydrochloride Produced by Example 24 with a Typical Sample of that Compound Produced in Benzene*

|  | Ethylene Dichloride Process (Example 24) | Benzene Process |
|---|---|---|
| Appearance_____ | small, near-white crystals. | fine, brown powder. |
| Ionic Chlorine—percent theory_____ | 99.6_____ | 99.0. |
| Total Chlorine—percent theory_____ | 99.4_____ | 99.0. |
| Melting Point, °C_____ | 189.3-190.7___ | 184-186. |
| Color, percent Trans_____ | 70_____ | 0 (approx.). |
| Volatile Acidity, percent HCl_____ | 0.002_____ | _____ |
| Iron, p.p.m. Fe_____ | 7.0_____ | 150. |
| Water Insolubles, percent_____ | 0.012_____ | 0.20. |
| Volatiles, percent_____ | 0.06_____ | 0.30. |
| Apparent Density, lb./cu. ft_____ | 24.5_____ | 21.3. |

As shown by the data of Table VIII, the 1-dimethylamino-2-chloropropane hydrochloride produced by Example 24 was definitely superior to the compound heretofore obtained by the use of benzene as a reaction medium in a number of important respects. The product of this method was in the form of small, but discrete particles, compared with the dust-like, agglomerated product obtained using benzene as a reaction medium. Other important improvements appear in melting point, in color, in residual iron content, in the content of water-insoluble products, in the content of undesirable volatile material and in the apparent density of the product.

In the foregoing, the method in accordance with this invention has been specifically illustrated by its use on a pilot plant scale and numerous specific details have been given to illustrate its most efficient use. These examples and details have been given for the purpose of fully disclosing the invention and it will be fully understood that many variations and changes can be made in these details without departing from the spirit of this invention or the scope of the following claims.

I claim:

1. A method for the production of 1-dimethylamino-2-chloroethane hydrochloride which comprises reacting thionyl chloride with dimethylaminoethanol in the presence of a reaction medium consisting essentially of ethylene dichloride while utilizing a stoichiometric excess of thionyl chloride within the range of 1.05 moles to about 1.30 moles per mole of dimethylaminoethanol reacted and, as a reaction medium, about 2.5 parts, by weight, to about 5.2 parts, by weight, of ethylene dichloride per part, by weight, of dimethylaminoethanol reacted, filtering the slurry formed by the reaction, washing the crystalline 1-dimethylamino-2-chloroethane hydrochloride separated as a filtrate with ethylene dichloride and evaporating the residual ethylene dichloride from the crystals of 1-dimethylamino-2-chloroethane hydrochloride.

2. A method for the production of 1-dimethylamino-2-chloroethane hydrochloride which comprises reacting thionyl chloride with dimethylaminoethanol in the presence of a reaction medium consisting essentially of ethylene dichloride while utilizing a stoichiometric excess of thionyl chloride within the range of 1.05 moles to about 1.30 moles per mole of dimethylaminoethanol reacted and, as a reaction medium, about 2.5 parts, by weight, to about 5.2 parts, by weight, of ethylene dichloride per part, by weight, of dimethylaminoethanol reacted, and utilizing a maximum reaction temperature within the range of about 50° C. to the reflux temperature of the reaction mixture when under atmospheric pressure, filtering the slurry formed by the reaction, washing the crystalline 1-dimethylamino-2-chloroethane hydrochloride separated as a filtrate with ethylene dichloride and evaporating the residual ethylene dichloride from the crystals of 1-dimethylamino-2-chloroethane hydrochloride.

3. A method for the production of 1-dimethylamino- 2-chloropropane hydrochloride which comprises reacting thionyl chloride with dimethylaminoisopropanol in the presence of a reaction medium consisting essentially of ethylene dichloride while utilizing a stoichiometric excess of thionyl chloride within the range of about 1.10 moles to about 1.50 moles per mole of dimethylaminoisopropanol reacted and, as a reaction medium, about 5 parts, by weight, to about 8 parts, by weight, of ethylene dichloride per part, by weight, of dimethylaminoisopropanol reacted filtering the slurry formed by the reaction, washing the crystalline 1-dimethylamino-2-chloroisopropanol hydrochloride with ethylene dichloride and evaporating the residual ethylene dichloride from the crystals of 1-dimethylamino-2-chloropropane hydrochloride.

4. A method for the production of 1-dimethylamino-2-chloropropane hydrochloride which comprises reacting thionyl chloride with dimethylaminoisopropanol in the presence of a reaction medium consisting essentially of ethylene dichloride while utilizing a stoichiometric excess of thionyl chloride within the range of about 1.10 moles to about 1.50 moles per mole of dimethylaminoisopropanol reacted and, as a reaction medium, about 5 parts, by weight, to about 8 parts, by weight, of ethylene dichloride per part, by weight, of dimethylaminoisopropanol reacted and utilizing a maximum reaction temperature within the range of about 50° C. to the reflux temperature of the reaction mixture when under atmospheric pressure, filtering the slurry formed by the reaction, washing the crystalline 1-dimethylamino-2-chloroisopropanol hydrochloride with ethylene dichloride and evaporating the residual ethylene dichloride from the crystals of 1-dimethylamino-2-chloropropane hydrochloride.

References Cited in the file of this patent
UNITED STATES PATENTS

| | | |
|---|---|---|
| 2,837,518 | Jacob et al. | June 3, 1958 |
| 2,867,660 | Goldberg et al. | Jan. 6, 1959 |

FOREIGN PATENTS

| | | |
|---|---|---|
| 456,338 | Great Britain | Nov. 3, 1936 |